United States Patent
Coburn et al.

(10) Patent No.: US 9,674,476 B2
(45) Date of Patent: Jun. 6, 2017

(54) PERSONALIZED MULTIMEDIA CONTENT DRIVEN BY USER PREFERENCES

(75) Inventors: Matthew Coburn, Denver, CO (US); Karen Taxier, Highlands Ranch, CO (US); Luke VanDuyn, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 445 days.

(21) Appl. No.: 12/370,492

(22) Filed: Feb. 12, 2009

(65) Prior Publication Data

US 2010/0205636 A1 Aug. 12, 2010

(51) Int. Cl.
| | |
|---|---|
| H04N 21/475 | (2011.01) |
| H04N 5/445 | (2011.01) |
| H04N 21/45 | (2011.01) |
| H04N 21/222 | (2011.01) |
| H04N 21/258 | (2011.01) |
| H04N 21/442 | (2011.01) |
| H04N 21/462 | (2011.01) |
| H04N 21/482 | (2011.01) |
| H04N 21/658 | (2011.01) |

(52) U.S. Cl.
CPC ..... *H04N 5/44543* (2013.01); *H04N 21/2221* (2013.01); *H04N 21/25883* (2013.01); *H04N 21/25891* (2013.01); *H04N 21/44222* (2013.01); *H04N 21/4532* (2013.01); *H04N 21/4622* (2013.01); *H04N 21/4755* (2013.01); *H04N 21/4826* (2013.01); *H04N 21/6582* (2013.01)

(58) Field of Classification Search
USPC .................................................. 725/44–46
See application file for complete search history.

(56) References Cited

U.S. PATENT DOCUMENTS

| | | | |
|---|---|---|---|
| 5,867,226 A * | 2/1999 | Wehmeyer et al. ............ 725/46 |
| 6,934,917 B2 * | 8/2005 | Lin ................................ 715/811 |
| 2002/0104087 A1 * | 8/2002 | Schaffer et al. ................ 725/46 |

(Continued)

FOREIGN PATENT DOCUMENTS

| | | |
|---|---|---|
| EP | 1401198 A2 | 3/2004 |
| JP | 2005039748 A | 2/2005 |
| WO | 2004054259 A1 | 6/2004 |

OTHER PUBLICATIONS

USPTO, Final Office Action, mailed Jul. 24, 2013 for U.S. Appl. No. 11/948,180.

(Continued)

*Primary Examiner* — Nicholas Corbo
(74) *Attorney, Agent, or Firm* — LK Global

(57) ABSTRACT

One embodiment may take the form of an apparatus for providing personalized multimedia content to a user of a television system based on the user's preferences. In one implementation, a television receiver of a television system may monitor the habits and usage of the users of the system. The information gathered concerning the usage of the system may be stored in a database and accessed by the television receiver to provide multimedia options to a user that may be of interest to the user. These options may be presented to the user through any number of on-screen guides accessible by the user on the television system. In other implementations, the multimedia options based on the user's preferences may be automatically presented to the user as part of a favorite channels list at least partially constructed by the user.

8 Claims, 8 Drawing Sheets

| ON DEMAND | | | | | 9:52AM FRI 2/29 | ? ▽ △ | |
|---|---|---|---|---|---|---|---|
| ♡ ALL CHAN | ALL SUB | ALL HD | MATTS FAVS | | | | |
| IRON MAN (ALL DAY) PG-13 MOVIE ROBERT DOWNEY JR., TERRENCE HOWARD, GWENETH PALTROW. (2008) A WEALTHY INDUSTRIALIST BUILDS AN ARMORED SUIT AND USES IT TO DEFEAT CRIMINALS AND TERRORISTS. BASED ON THE COMIC BOOK CHARACTER. | | | | | | | |
| FRI 12/3 | 9:00 | 9:30 | 10:00 | 10:30 | 11:00 | 11:30 | ←330 |
| 321 BRAVO | JOE VERSUS THE VOLCANO | | PROBLEM CHILD | MY OWN WORST ENEMY | CHARMED | NBA ACTION | |
| 295 CNBC | MEET THE ROBINSONS | | | | FRIENDS | FRIENDS | |
| 176 BBC | ART SCHOOL CONFIDENTIAL | | MOTORSPORTS HOUR | | MY OWN WORST ENEMY | MY OWN WORST ENEMY | |
| 109 FOX | SPORTS CENTER | | MOTORSPORTS HOUR | | JOE THE PLUMBER | CHARMED | |
| 101 HBO | SHADOWS AND FOG | | THE OFFICE | THE TV SET | PROBLEM CHILD | TRUE BLOOD | |

310   320   300   340

(56) References Cited

U.S. PATENT DOCUMENTS

| | | | |
|---|---|---|---|
| 2002/0174430 | A1 | 11/2002 | Ellis et al. |
| 2003/0020744 | A1 | 1/2003 | Ellis et al. |
| 2003/0037333 | A1* | 2/2003 | Ghashghai ............. H04H 60/39 725/46 |
| 2003/0066085 | A1 | 4/2003 | Boyer et al. |
| 2003/0084448 | A1* | 5/2003 | Soundararajan ................ 725/46 |
| 2005/0091690 | A1 | 4/2005 | Delpuch et al. |
| 2005/0097607 | A1 | 5/2005 | Kummer et al. |
| 2005/0186988 | A1 | 8/2005 | Lim et al. |
| 2006/0242665 | A1 | 10/2006 | Knee et al. |
| 2007/0277202 | A1* | 11/2007 | Lin et al. ......................... 725/46 |
| 2007/0288964 | A1 | 12/2007 | Horiguchi |
| 2008/0022305 | A1* | 1/2008 | Thompson ...................... 725/39 |
| 2008/0120668 | A1* | 5/2008 | Yau ............................... 725/110 |
| 2013/0014167 | A1* | 1/2013 | Sakashita et al. .............. 725/46 |

OTHER PUBLICATIONS

European Patent Office European Search Report mailed Feb. 23, 2009; European Appln. No. 08170017.1.

European Patent Office "European Communicatino" mailed May 11, 2010; European Appln. No. 08170017.1.

Tivo Viewer's Guide "Tivo Viewer's Guide Passage" dated Jan. 1, 2002, XP002366656.

USPTO, US Non-Final Office Action issued in U.S. Appl. No. 11/948,180, mailed Dec. 24, 2012.

USPTO, Notice of Allowance, mailed Jan. 10, 2014 for U.S. Appl. No. 11/948,180.

\* cited by examiner

| ON DEMAND | | | | 9:52AM FRI 2/29 | ? ▽ △ |
|---|---|---|---|---|---|
| ♡ | ALL CHAN | ALL SUB | ALL HD | MATTS FAVS | |
| IRON MAN (ALL DAY) PG-13 MOVIE | | | | | |
| ROBERT DOWNEY JR., TERRENCE HOWARD, GWENETH PALTROW. (2008) A WEALTHY INDUSTRIALIST BUILDS AN ARMORED SUIT AND USES IT TO DEFEAT CRIMINALS AND TERRORISTS. BASED ON THE COMIC BOOK CHARACTER. | | | | | |
| FRI 12/3 | 9:00 | 9:30 | 10:00 | 10:30 | 11:00 | 11:30 |
|---|---|---|---|---|---|---|
| 321 BRAVO | JOE VERSUS THE VOLCANO | | PROBLEM CHILD | MY OWN WORST ENEMY | CHARMED | NBA ACTION |
| 295 CNBC | | MEET THE ROBINSONS | | | FRIENDS | FRIENDS |
| 176 BBC | ART SCHOOL CONFIDENTIAL | | MOTORSPORTS HOUR | | MY OWN WORST ENEMY | MY OWN WORST ENEMY |
| 109 FOX | SPORTS CENTER | | MOTORSPORTS HOUR | | JOE THE PLUMBER | CHARMED |
| 101 HBO | SHADOWS AND FOG | | THE OFFICE | THE TV SET | PROBLEM CHILD | TRUE BLOOD |

FIG.3

PERSONALIZED MULTIMEDIA CONTENT DRIVEN BY USER PREFERENCES

TECHNICAL FIELD

The present invention relates generally to television systems, and more particularly to providing personalized multimedia content based on user preferences through an interface of a television receiver.

BACKGROUND

Many digital cable, satellite and terrestrial television systems transmit an incoming television signal provided by a television provider to a set-top box or other television receiver. The set-top box may receive the encrypted signal and convert it into a signal that the user's television recognizes in order to display it to the user. By utilizing the set-top box of the television system, the user may view several multimedia programs offered by the system for the user's entertainment.

To allow the user to interact with the system, the set-top box may provide an interface to and receive inputs from the user of the television system. For example, the user may utilize a remote control to access the set-top box to select a particular channel to view. The user may input the desired channel directly from the remote or may select the channel from a on-screen guide. Generally, the on-screen guide may include a list of all available channels to the user and some indication of what may be currently airing on each available channel. Some on-screen guides also allow the user to locate multimedia programs that may air on a particular channel in the future by scrolling ahead in time through the guide.

Further, some set-top boxes also allow the user to configure the on-screen guide to provide a different look and different options to different users. For example, the user may select certain channels that may be included in a favorite channels list. The on-screen guide may then be altered to only show the channels that are included on the user's favorite channel list, thereby reducing the total number of available channels shown to the user on the on-screen guide. Other features of the on-screen guide may provide the user with pay-per-view programs, may allow the user to record television programs to a digital video recorder, and restrict certain channels from being viewed by children based on a program rating.

Generally, whether in the full guide mode or favorites list mode, the on-screen guide may initially show whatever channel is currently being viewed by the user and the surrounding channels. For example, if the user is watching a local channel (such as channel 2) and accesses the on-screen guide, the set-top box will initially present the user with a view that includes the current local channel, as well as several surrounding channels (such as channels 3-10). However, when the user is viewing the on-screen guide, some multimedia programs that may be of interest to the viewer may not be presented without requiring the viewer to scroll through the guide to find a particular program or channel. Thus, what is needed is an on-screen guide that presents multimedia channels or programs to the user that may be of interest to the user, without the necessity of the user to scroll through the on-screen guide to find the particular program.

BRIEF SUMMARY

One implementation may take the form of a method for providing personalized multimedia content to a user of a television system. The method may comprise a first operation of utilizing a television receiver of the television system comprising a processor configured to monitor the access of at least one channel by a user of the television system. The method may also comprise the operations of creating a database in a computer-readable storage medium with the database configured to maintain an entry for the at least one accessed channel, analyzing the database to determine a user preference and providing an option to the user to access a multimedia program based on the determined user preference.

Another implementation may take the form of a television receiver comprising a microprocessor, an I/O interface coupled to the microprocessor with the I/O interface configured to receive an input from a user of a television system and a computer-readable storage medium configured to storing a computer-executable code. Further, when the computer-executable code is executed by the television receiver, the code causes the television receiver to perform the operations of monitoring for the input received from the user through the I/O port, storing an indication of the user preference in a memory device when received and analyzing a listing of a plurality of available multimedia programs to determine a preferred multimedia program. The preferred multimedia program may include at least one feature that matches the user preference. Finally, the television receiver may perform the operation of providing an option to the user to access the multimedia program through an on-screen guide of the television receiver.

BRIEF DESCRIPTION OF THE DRAWINGS

FIG. 3 depicts a screenshot of a user interface presented to a user from a set-top box, the user interface including an on-screen guide.

DETAILED DESCRIPTION

One embodiment may take the form of an apparatus for providing personalized multimedia content to a user of a television system based on the user's preferences. In one implementation, a television receiver of a television system may monitor the habits and usage of one or more users of the system. The information gathered concerning the usage of the system may be stored in a database and accessed by the television receiver to provide multimedia options to a user that may be of interest to him or her. These options may be presented to the user through any number of on-screen guides accessible by the user on the television system. In other implementations, the multimedia options based on the user's preferences may be automatically presented to the user as part of a favorite channels list at least partially constructed by the user.

The television receiver will be described herein as a set-top box, such as a satellite television, cable television, terrestrial television or internet television receiver that is external to an association presentation device. However, it is to be appreciated that the television receiver may also be integrated within a presentation device, such as a television with an integrated cable television receiver.

Figure 1:
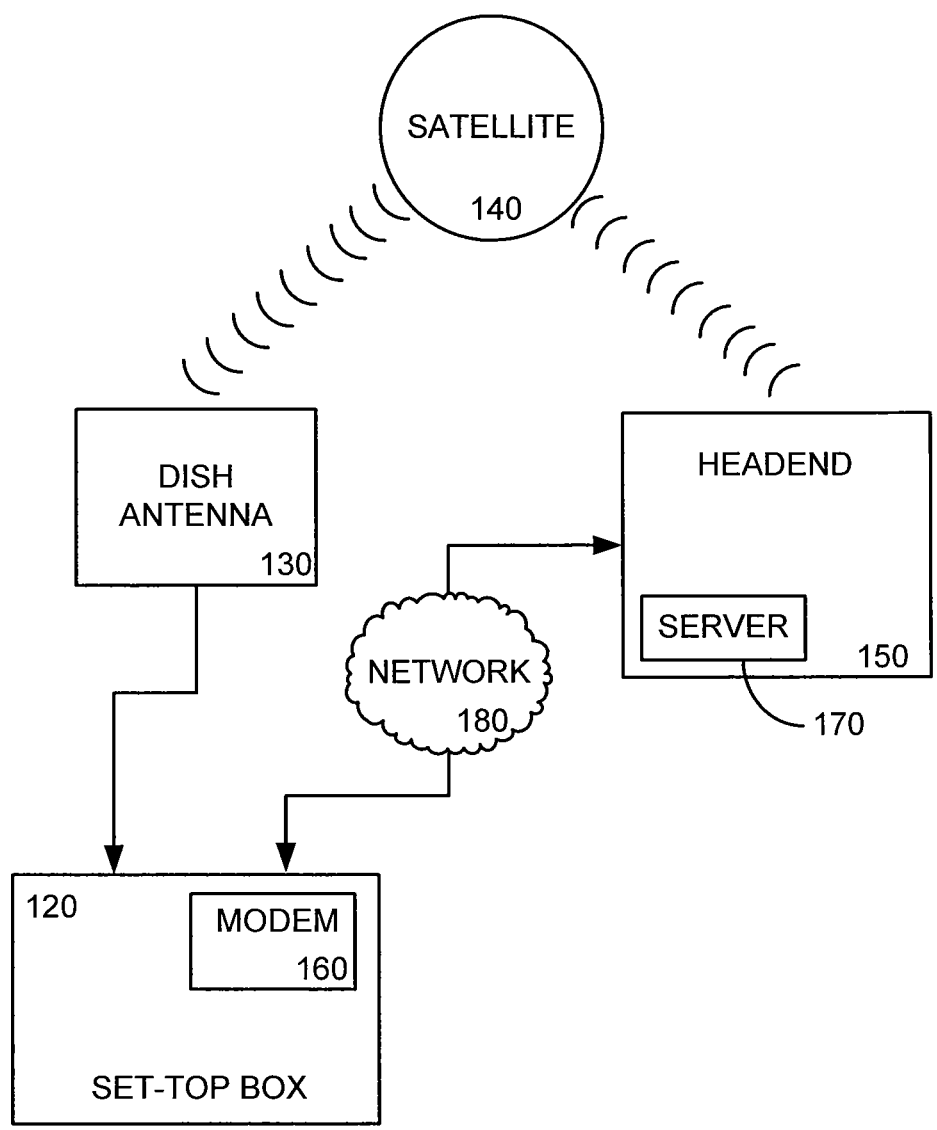
FIG. 1 depicts an exemplary satellite television system that may utilize a first embodiment to provide.

FIG. 1 depicts an exemplary satellite television system that may utilize a first embodiment to provide personalized multimedia content to a user of a television system based on the user's preferences. The satellite system of FIG. 1 is one example of a system that may provide the personalized multimedia content to the user. Alternatively, a digital cable satellite system or any other television system may also utilize the embodiments described herein.

The television system of FIG. 1 may include a set-top box (STB) 120 configured to provide a user with an interface to the television system. As described above, the STB 120 of the system may receive an encrypted television signal and convert it into a signal that a user's television may recognize in order to display it to the user. Further, the STB 120 may provide the converted signal to a display device, such as a television or computer screen, for display to the user. In one implementation, the STB 120 may receive the encrypted signal from a satellite 140 or through a digital cable or network connection. Further, in the satellite and digital cable configurations, the encrypted television signal may be generated by a headed 150 and transmitted to the STB 120. Generally, the headend 150 may be a master facility that receives television signals for processing and distribution to various television systems. In a satellite television provider, the headend 150 may transmit the audio/visual signal to a satellite 140 for redistribution to subscribers. Upon receipt, the satellite 140 may transmit the signal to a dish antenna 130 connected to the STB 120 for decryption.

In a cable television system configuration, the headend 150 may transmit the television signal directly to the STB 120 over a cable network connection. For example, the signal may be provided to the STB 120 through a dedicated cable connected between the STB 120 and the headend 150. Alternatively, the signal may be provided over a network 180 connection, utilizing a modem 160 associated with the STB 120. Additionally, the headend 150 may utilize the network 180 to provide other communication signals to the STB 120. For example, the headend 150 may utilize a server 170 in communication with the headend and the network 180 provide programming updates to the STB 120 over the network connection. Further, the STB 120 may also communicate over the network 180 connection to provide information to the headend 150 or to store information within the network 180 itself.

Figure 2:
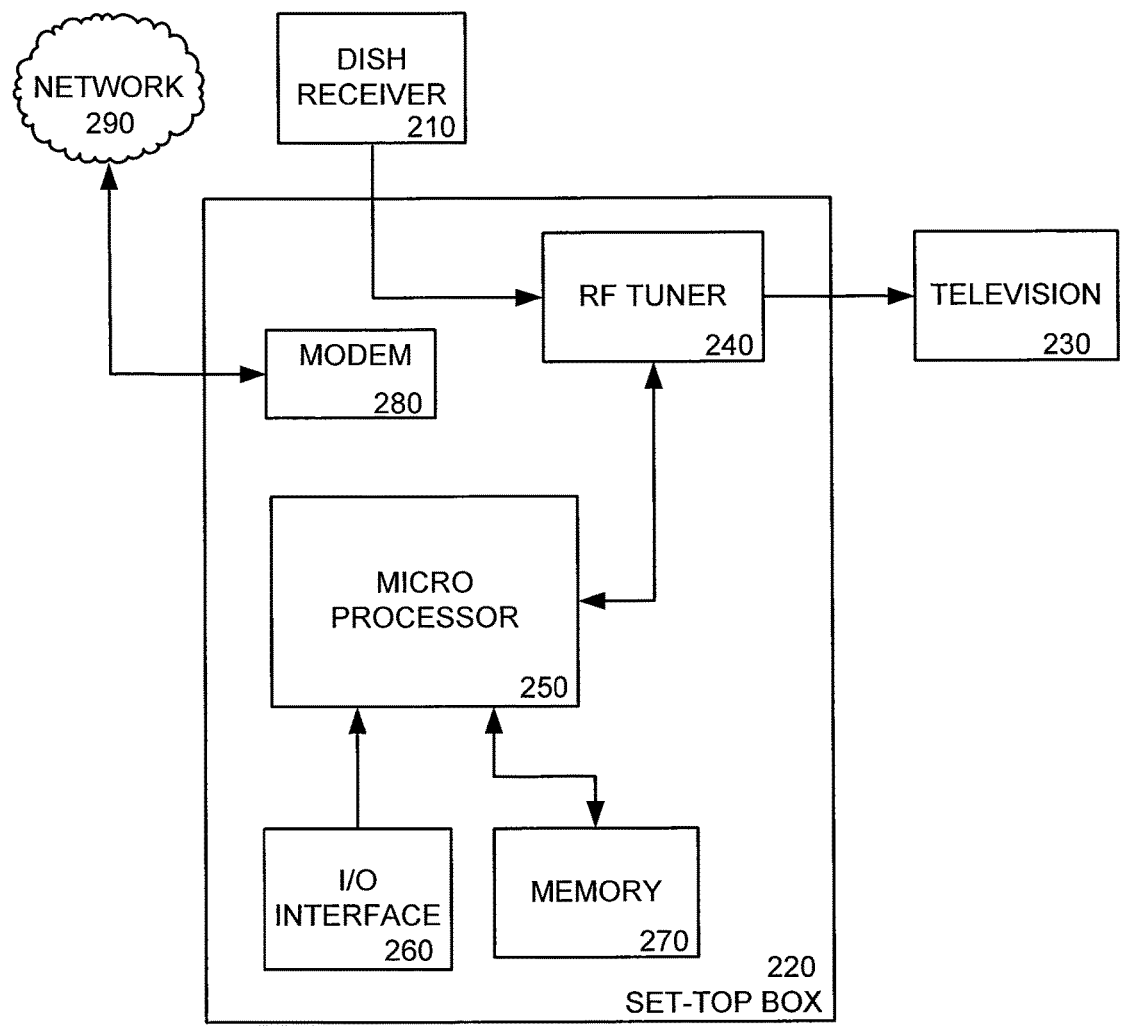
FIG. 2 is a block diagram illustrating an example of a set-top box which may be used in implementing embodiments described herein.

FIG. 2 is a block diagram illustrating an example of a STB 220 which may be used in implementing embodiments described herein. The STB 220 may receive a transmitted television signal from a satellite dish receiver 210 and may transmit a translated signal to a user's television 230 for display to the user. The television signal may be received at the STB 220 by a radio frequency (RF) tuner 240. The RF tuner 240 may translate the received signal and provide that signal to the user's television 230. Although not shown, the satellite dish receiver 210 may include a low noise block (LNB) or other components to decrypt and transmit the received television signal. Similarly, the STB 220 may include more or fewer components as those shown Further, as described above, the STB 220 may provide an interface to the user through the user's television 230. To provide the interface to the user, the STB 220 may include a microprocessor 250 coupled to memory 270, as described in more detail below. The set-top box may also include an input/output (I/O) interface 260 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 250. The I/O device may be utilized by a user to provide inputs and commands to the STB 220 to control the interface. Inputs may also be received from a network 290 through a modem 280 coupled to the STB 220. The modem 280 may be connected to the STB 220 through the I/O interface 260 or may be integrated within the STB 220. The modem 280 may also be configured to communicate over the network 290 to provide and receive information and commands from the network.

STB 220 may also include a dynamic storage device, referred to as memory 270, or a random access memory (RAM) or other devices coupled to the STB for storing information and instructions to be executed by the microprocessor 250. Memory 270 also may be used for storing temporary variables or other intermediate information during execution of instructions by the microprocessor 250.

According to one embodiment, the implementations described below may be performed by a STB 220 in response to microprocessor 250 executing one or more sequences of one or more instructions contained in memory 270. These instructions may be read into memory 270 from another machine-readable medium, such as a storage device. Execution of the sequences of instructions contained in memory 270 may cause the microprocessor 250 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 270. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

FIG. 3 depicts a screenshot of a user interface presented to a user from a set-top box, the user interface including an on-screen guide. The user interface may allow the user to interact and configure a television system, including providing the user with personalized multimedia content based on the user's preference. Such personalized content may be presented to the user through an on-screen guide or through any other interface menu that may allow a user to select a desired channel or program.

Generally, the user may access and interact with the user interface through a remote control. The remote control may allow the user to navigate through the various menus and options of the user interface to configure the interface as desired by the user. It should be appreciated, however, that the user may interact and provide inputs to the user interface through any I/O device, such as push-buttons located on the front of the STB.

One aspect of the user interface provided to the user may be an on-screen guide 300. Generally, the on-screen guide 300 may be accessed by the user to determine the various multimedia programs that may be available to the user to view or listen to. To provide this information to the user, the on-screen guide 300 may include several components. One component may list the various channels 310 that may be available to the user to view. For example, the on-screen guide may include a list of available channels, including a currently viewed channel and several surrounding channels. These channels 310 may be listed by channel number. Thus, as one example, channel "2" may be listed near the top of the on-screen guide with each subsequent channel listed in order below channel "2."

The on-screen guide may also provide an indication 320 to the user of which programs may be airing or may air in the future on each channel. For example, located next to the indicator of channel "2" on the list of available channels 310, the on-screen guide may include a list 320 of the title of the currently airing program on that channel. The program listing 320 may be presented by when the program airs. Thus, the on-screen guide 300 may also include a listing of air time 330 for each program listed. The on-screen guide may also include programs that may air in the future on each channel, further sorted by air time.

Thus, the list included on the on-screen guide 300 may inform the user as to which channels are available to view and which programs 320 are airing or which future programs 340 will air on each available channel 310. The user may then scroll through the list of programs 300 to find a program of interest to the user. Generally, merely selecting a program from the on-screen guide will change channels of the television system to that program and begin presenting the program to the user through the user's television.

The on-screen guide 300 may also be configured by the user. For example, the user may create a favorites list that includes only those channels that the user selects. Thus, instead of presenting every available channel to the user, the on-screen guide may be pared down to a smaller list including only those channels selected by the user as "favorite" channels. Thus, when the user accesses the favorites list, only certain selected channels may be presented to the user in the on-screen guide. This may allow the user to browse through the on-screen guide quicker as, presumably, less channels may be included in the list.

Figure 4:
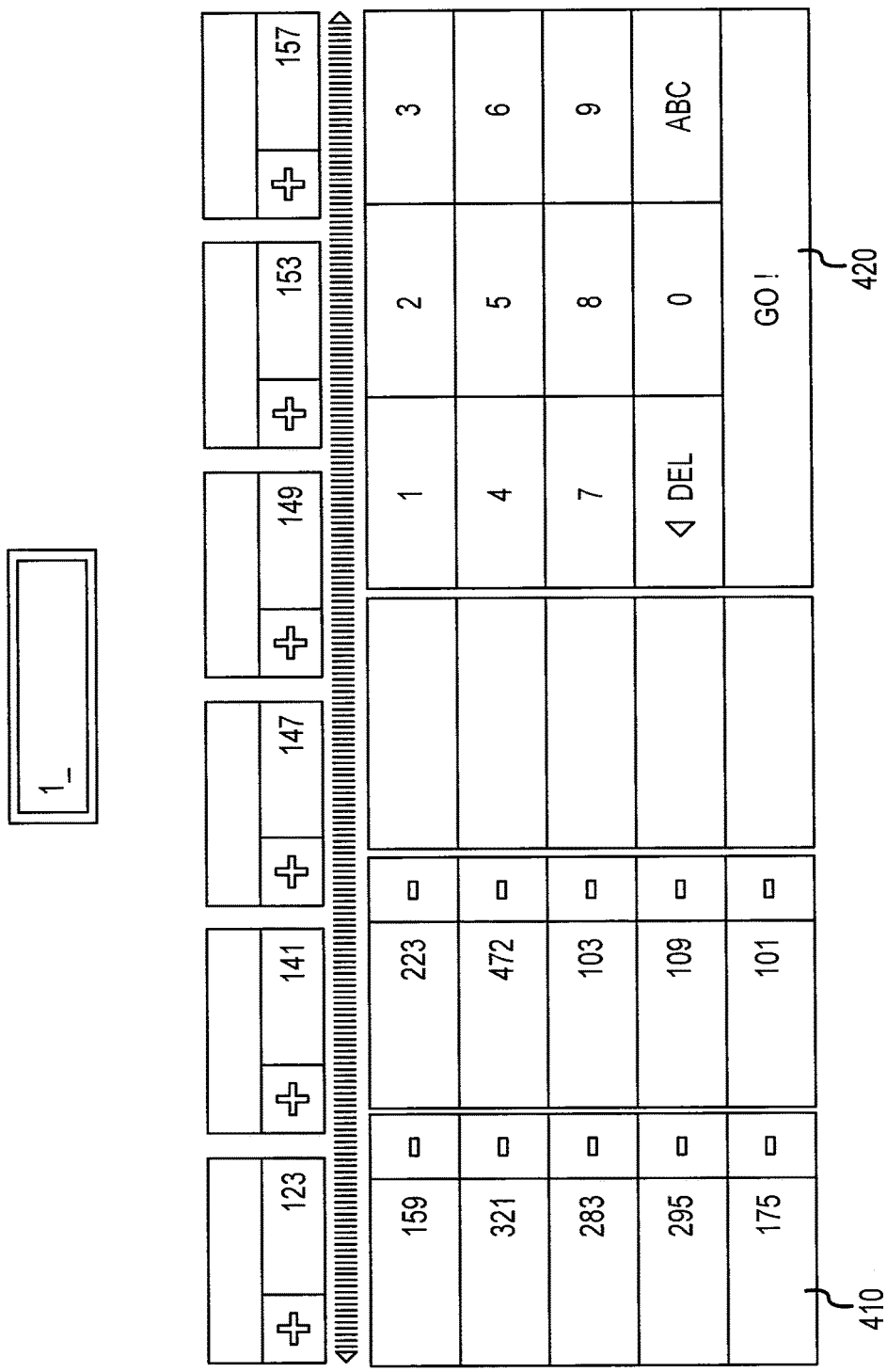
FIG. 4 depicts a screenshot of a user interface of a set-top box providing direct links to pre-selected channels.

FIG. 4 depicts a screenshot of a user interface of a set-top box providing direct links to pre-selected channels. The user interface including direct links may provide an alternative method for the user to select a channel or program to view. For example, several channel options may be presented to the user as a list of channel indicators 410. To access the different channels in the list of indicators 410, the user may click or otherwise choose any of the indicators listed to be automatically sent to that channel. For example, the user may click or choose the "HBO" indicator to be directly connected to the "HBO" channel and begin viewing the program currently airing on HBO. Thus, this interface may provide the user with direct links to a particular channel without the necessity of the user having to scroll through an on-screen guide to access the channel.

The direct links 410 of the interface depicted in FIG. 4 may be populated in several ways. For example, the user may utilize a graphical number pad 420 to select certain channels for direct links. Alternatively, the graphical number pad 420 may include serial letters to allow the user to spell a desired channel. Once the channel is located by the user, the interface may place a direct link into the list of direct links 410 for quick access by the user. In another embodiment, a favorites list may be automatically imported into the direct links list 410. For example, the user may create a favorite channels list as described above with reference to FIG. 3, utilizing the on-screen guide of the STB. Once created, the list may be automatically imported into the direct links list 410 for quick access by the user. Thus, the user may access at least a portion of his/her favorites list through the direct links of the interface of FIG. 4.

Figure 5:
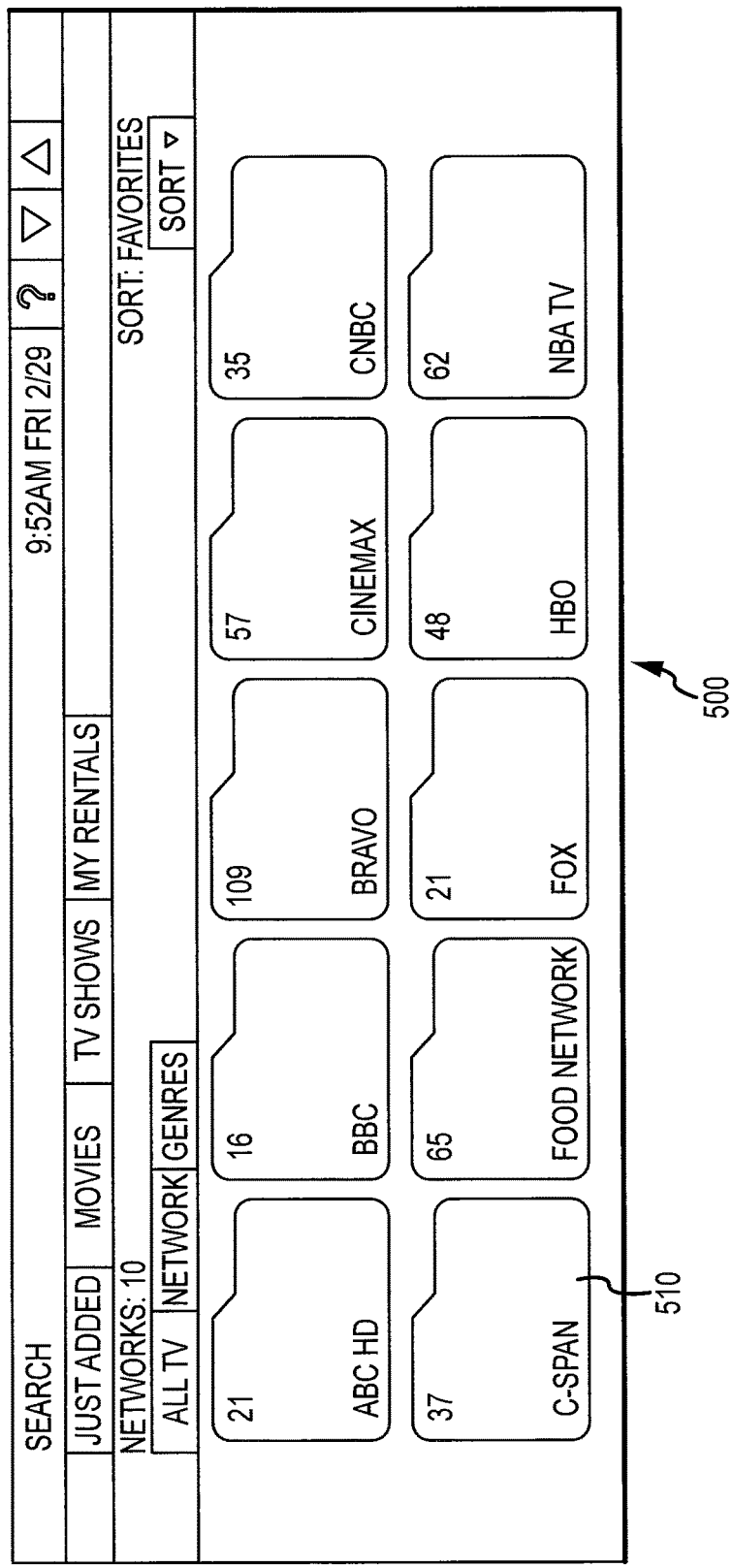
FIG. 5 depicts a screenshot of a user interface of a set-top box including an on-screen guide, the on-screen guide including multimedia content derived from the user's preference.

FIG. 5 depicts a screenshot of a user interface of a set-top box including an on-screen guide, the on-screen guide including multimedia content derived from the user's preferences. In one implementation, the user's preferences may be gathered through the monitoring of the user's activities of the set-top box, such as the programs viewed or the channels accessed by the user. In another implementation, the user's preference may be ascertained by the channels the user decides to include in a list of favorite channels.

As shown in FIG. 5, the on-screen guide 500 including personalized multimedia based on a user's preferences may be different from the on-screen guide depicted in FIG. 3. Rather, the on-screen guide 500 may just include a list of available channels 510 that may be of interest to the user. Thus, this particular on-screen guide 500 may be similar to a favorites list, but presenting only a list of available channels. Further, the on-screen guide 510 may include one or more channels that are selected based on a user's preferences as monitored by the STB.

Alternatively, the on-screen guide may be similar to the on-screen guide depicted in FIG. 3. Thus, the on-screen guide may include a list of all available channels and the programs that may be airing on those channels. However, instead of merely listing the channels in order, the on-screen guide may utilize monitored user preferences to reorder the on-screen guide list such that certain channels or programs that may be of interest to the user are presented to the user without the need of the user to scroll through the entire list of channels to find the preferred program. In a similar manner, channels of interest to the user may be included in a direct link interface, such as shown in FIG. 4. Thus, providing personalized multimedia content to a user based on the user's preferences may be included in any interface that may be provided to the user.

As described in more detail below, the STB may monitor the usage of the STB by a user and gather information on a user's preferences. For example, the STB may recognize that the user prefers to watch sporting events, perhaps by noting that the user watches sporting channels and sporting events often. In another example, the STB may recognize that the user prefers to watch the local news channels when they air. This information about the user's preferences may be utilized by the STB to configure the on-screen guide of the STB.

In one implementation, the user's preferences may be utilized to move the listing of certain channels nearer to the top of the on-screen guide. For example, if the user's preference information indicates that the user may prefer to watch sporting events, the STB may list a sports-related channel, such as ESPN, near the top of the on-screen guide such that, no matter what channel the user may be watching, the ESPN listing may be viewed by the user when the on-screen guide is first accessed. Other channels may also be presented based on the user's preferences, such as movie channels, home-shopping channels, educational channels, etc. Generally, any channel may be moved up the list of the on-screen guide based on monitored user preferences.

Further, the configuration of the on-screen guide may be at least partially based on a particular air date and time for a program that may of interest for the user. For example, the STB may determine that a user has a preference for children's programming, such as cartoon programs. The STB may then be configured to provide a channel suggestion to the user when a cartoon that matches the user's preferences may be airing. For example, a children's cartoon may air on Saturday morning on channel 2. Thus, at a certain time before the cartoon airs, channel 2 may be provided in the user's on-screen guide in anticipation that the user may desire to view that particular program. Generally, the channel may be included on the on-screen any time before or during when the program airs. In one implementation, the channel may be included in the on-screen guide 30 minutes before the preferred program may air.

As should be appreciated, the inclusion of a channel based on the monitored user preferences may be utilized for many different types of channels or programs and at all times of the day. For example, a user's STB may configure the on-screen guide to include channels airing news programs around 6 p.m. on the weekdays, children's programming during the morning hours and movie channels during the weekend, all in response to the monitored user preferences.

In another implementation, the on-screen guide may be configured in response to the selection of certain channels by the user as favorites. For example, the user may create a favorite channels list by utilizing the on-screen interface, such as that shown in FIG. 4. The list may be populated by the STB as the user selects which channels are of the most interest to the user. However, the favorite channel list may also be utilized by the STB to determine the user's preferences. For example, if the user selects several movie channels as favorite channels, then the STB may determine that the user may enjoy viewing movies while watching the television. This information may be used by the STB to suggest certain multimedia content that may be of interest to the user. Further, such information may be combined with information concerning the user's preferences above to provide targeted multimedia content.

Further, the same techniques described above of presenting personalized content on an on-screen guide may also apply to other listings within the STB interface. For example, the interface may include a listing of all available pay-per-view programs, such as sporting events, movies, concerts etc. In one implementation, the listing of such events may be configured in response to the monitored user preference as described above. Thus, if a user shows a preference for action movies, the pay-per-view movie channels showing action films may be presented to the user first when the user accesses the pay-per-view menu. A similar technique may be used to list the contents of a digital video recorder or a favorites list.

Another implementation may allow the user to configure the parameters of the population of the on-screen guide with personalized content. For example, a user may not want certain channels to appear on the on-screen guide and may configure the STB to not include those channels. Thus, if a user does not want movie channels to be suggested during the morning hours in case children may be watching the television, the on-screen guide may be configurable to prevent certain channels from being shown. Other implementations may, among other things, limit the number of suggested channels at any one time, alter the parameters that determine when a channel is suggested and limit the content of suggested channels (i.e. restricting rated "R" or "MA" programs from being suggested).

Other implementations may include channels in the user's on-screen guide based not on the monitored user's preferences, but on a preference for a geographical area or demographic. For example, the television system may determine that a sporting event including a local university team may be of interest to those that live within a 50 mile radius from the university campus. This determination may be made by the television provider or a third party and provided to the headend. In such cases, the television system may utilize the headend of the system to provide a message to each STB in that geographic area to include the channel that the sporting event is airing on into every user's on-screen guide. Similarly, the headend may store demographic information for every user of the television system. For example, the headend may maintain a database of each user's age, family makeup, income and location. This information may be utilized by the headend to provide targeted multimedia content to specific demographic groups that may be interested in such programming. The headend may then insert the program into the on-screen guide of each user that matches the demographic criteria in a similar manner as described above. The opportunity to provide the targeted content of a particular program may also be sold to a third party that wishes to generate more interest in the program.

Figure 6:
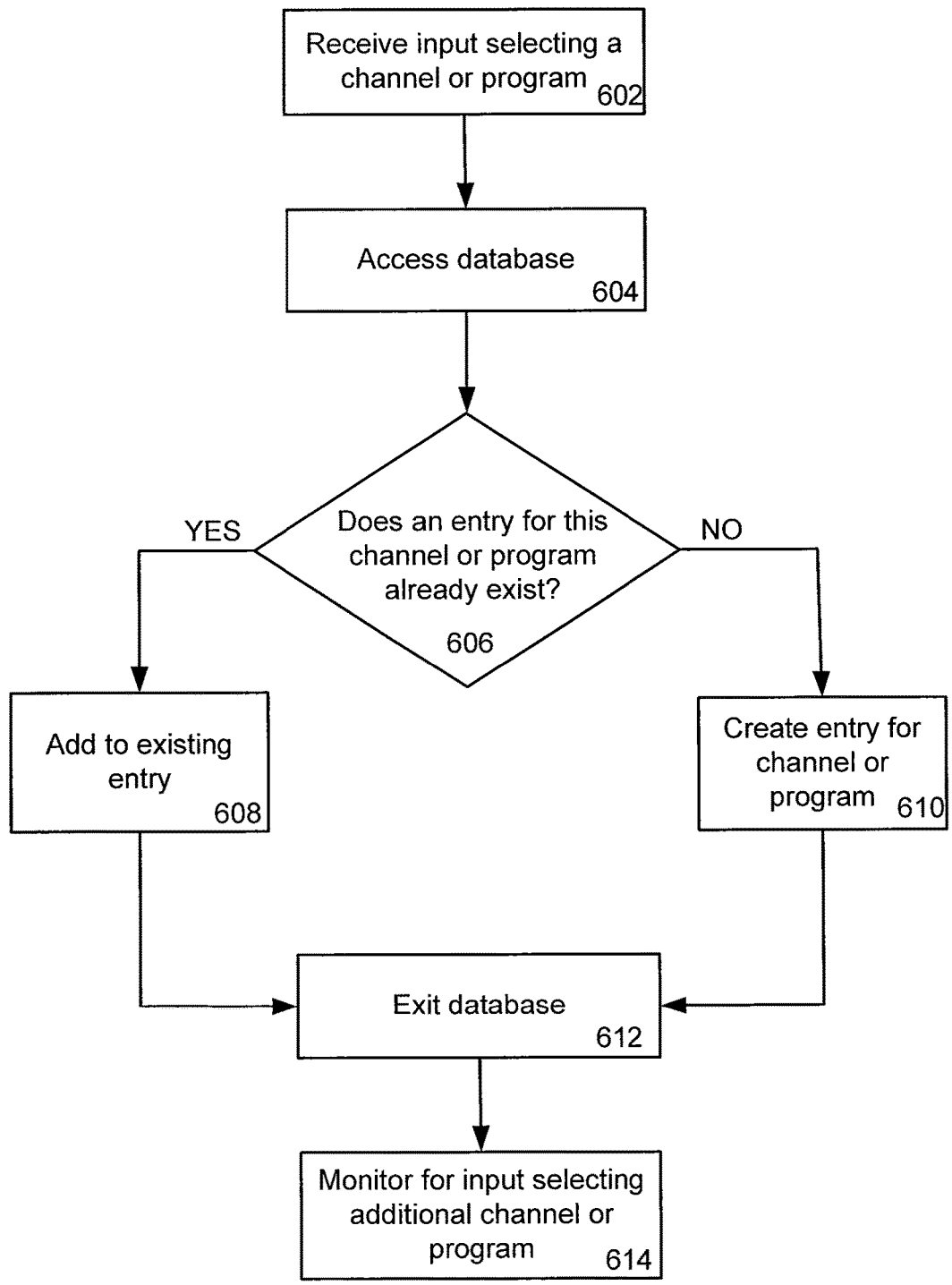
FIG. 6 is a flow chart depicting a method for a set-top box to monitor the television usage of a user based on the programs or channels viewed.

Several techniques may be implemented by a STB to monitor and determine a user's preference. FIG. 6 is a flow chart depicting one such method for a STB to monitor the television usage of a user based on the programs or channels viewed. Through this technique, a STB may populate a database containing indications of a user's preferences. This database may then be utilized by the STB to include personalized content into the several menus and options of a STB interface.

The STB may implement the technique set out in FIG. 6 by utilizing the many components of the STB. For example, the STB may include a computer-readable storage medium storing computer-executable code that, when activated or read by a processing device, may perform the operations set out below with reference to FIG. 6. The computer-readable storage medium may be internal to the STB or may electrically connected to the STB such that the processor may access the stored code. Further, inputs provided to the STB by a user may be received by an I/O interface associated with the STB. In one example, the I/O interface may receive inputs from a remote control device to manipulate and alter an interface provided to the user. Generally, the STB may utilize several components internal to or external to the STB to perform the operations set out below.

The technique to monitor and determine a user's preference may begin in operation 602 when a user accesses the STB to view a channel. As explained above, the user may activate a remote control to access the television channels on a STB. The signal sent from the remote control may be received through an I/O interface of the STB and processed by a processor to determine the desired operations of the user. Once a channel is selected by the user, the STB may access a database in operation 604. Each entry created for a user may be stored in several memory locations. In one embodiment, the entries may be stored within the computer-readable memory of the STB. Alternatively, the entries may be stored in memory external to that of the STB, such as an external hard drive or on a server of a network. In the server configuration, the entries may be transmitted from a modem associated with the STB to the server over a network connection as described above with reference to FIG. 1. The server may be located within the described network or may be located at the headend of the television system. Generally, any memory device that may store the created entries may be used with the described embodiments.

In operation 606, the STB may analyze the database and determine if an entry for the accessed channel already exists in the database and is associated with the particular user operating the STB and/or watching the channel. For example, the user may currently be viewing a program on channel "2". In operation 606, the STB may access the database to determine if an entry for that channel already exists. If such an indication is already included in the database, the entry may be altered in operation 608. The alteration of the entry may provide the database with more information about the user's preferences. For example, a counter included with the entry may be incremented, indicating that the channel "2" has been accessed again. In this manner, the database may maintain a running total of the number of times a particular channel is accessed.

In some configurations, the STB may distinguish between several users of the television system and maintain a usage database for each user. For example, the STB may include several user identifications that may be selected by a user when the user accesses the STB. Further, the STB may associate an entry in a database for each user to track and determine user preferences for each user of the STB. Thus, the STB may determine the preferences for several users of an STB and tailor the interface menus for an individual as described herein based on those preferences.

Additional information about the specific program being viewed by the user may also be included with each entry. For example, under each entry in the database may be a collection of each program viewed on that particular channel. Such information may include, but is not limited to, the program name, the type of program (such as sporting event, news, comedy movie, sitcom, etc.), the rating of the program and particular performers that may appear in the program. Generally, any information about the particular program being viewed by the user that may be used to determine a user's preference may be stored in the database. Thus, as new programs are viewed by the user for a particular channel, new entries may be created in the database for those new programs. Similarly, an indication may be included when a program is viewed that is already listed, such as a number next to the program tracking the number of times the program has been viewed.

Although discussed above with reference to the user's viewing habits, it should be appreciated that the methods described herein may also monitor the programs that the user records to a DVR or those programs for which the user sets a reminder. Further, the above described methods may be extended to monitor interactive programs, such as video games accessed through the television system, downloaded content and pay-per-view content. Generally, any act performed by the user that may indicate that the user may have an interest in a program or channel may be used by the embodiment.

If it is determined in operation 606 that the database does not include an entry for a particular channel or program airing on a particular channel, the STB may write a new entry into the database with an indication of the particular channel or program in operation 610. Generally, the addition of an entry may be similar to the modification of an entry in operation 608.

Once the channel and program information is stored in the database, the STB may exit the database in operation 612. Further, the STB may continue to monitor the program or channel accessed in operation 614. Upon the detection of the user viewing a new channel or program (such as by changing channels or viewing a new program on a current channel), the STB may return to operation 602 and perform the method of FIG. 6 to add or modify an entry in the database. Further, the information stored in the database may be accessed by the STB to create a suggested multimedia content to the user based on the user's stored preferences.

Further, the STB may also track the amount of time that the user spends viewing, accessing or interacting with each channel or program. Thus, for each entry stored in memory, an amount of time may be associated with that channel or program. Thus, if a user views a program or accesses a channel for five minutes, then the embodiment may store a value indicating the five minute interval that the program or channel was viewed by the user. In addition, the STB may keep track of several accesses of a single channel by adding the viewing time to a stored value. Continuing the above example, if the user accesses the same channel at a later time and views that channel for an additional five minutes, the STB may add the new recorded value to the previous value. Thus, the entry may maintain a value indicating a ten minute interval of viewing for that channel or program. In other words, each subsequent viewing of the channel or program may be added to the already existing entry in the database by the STB.

Figure 7:
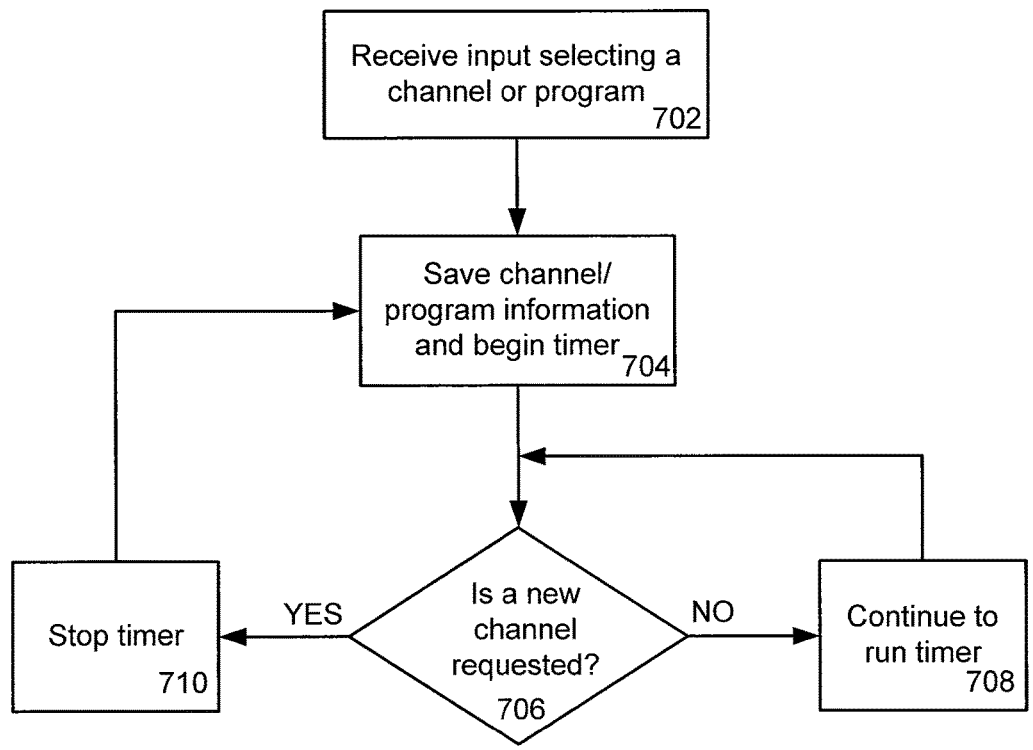
FIG. 7 is a flow chart depicting a method for a set-top box to monitor the television usage of a user based on the amount of time a certain program or channel is viewed.

FIG. 7 is a flow chart depicting a method for a set-top box to monitor the television usage of a user based on the amount of time a certain program or channel is viewed. The monitored information may be stored in a database that may be accessed and utilized by the STB to provide the user with personalized multimedia content based on the user's preferences. Further, the operations of the described method may be performed by the components of a STB in a similar manner as described above with reference to FIG. 6.

The embodiment may begin in operation 702 when a user accesses the STB to view a channel, much like operation 602 of FIG. 6. To record the viewing time of the user for a particular program or channel, a timer may begin tracking the viewing time in operation 704 when the user first accesses the channel or program. In the situation where an entry corresponding a channel or program already exists in memory or a database stored in a memory, the corresponding entry may be incremented accordingly.

In operation 706, the STB may wait for an input indicating that the user requests a new channel or program. The input may be received at the STB through an I/O interface associated with the STB. As long as a new channel is not requested by the user, the STB may continue to track the amount of time that the user has accessed the particular channel or program in operation 708 while continuing to monitor for a channel change. If a new channel is requested by the user, the timer for the previous channel may be stopped in operation 710 and a new entry may be created for the new, requested channel.

Figure 8:
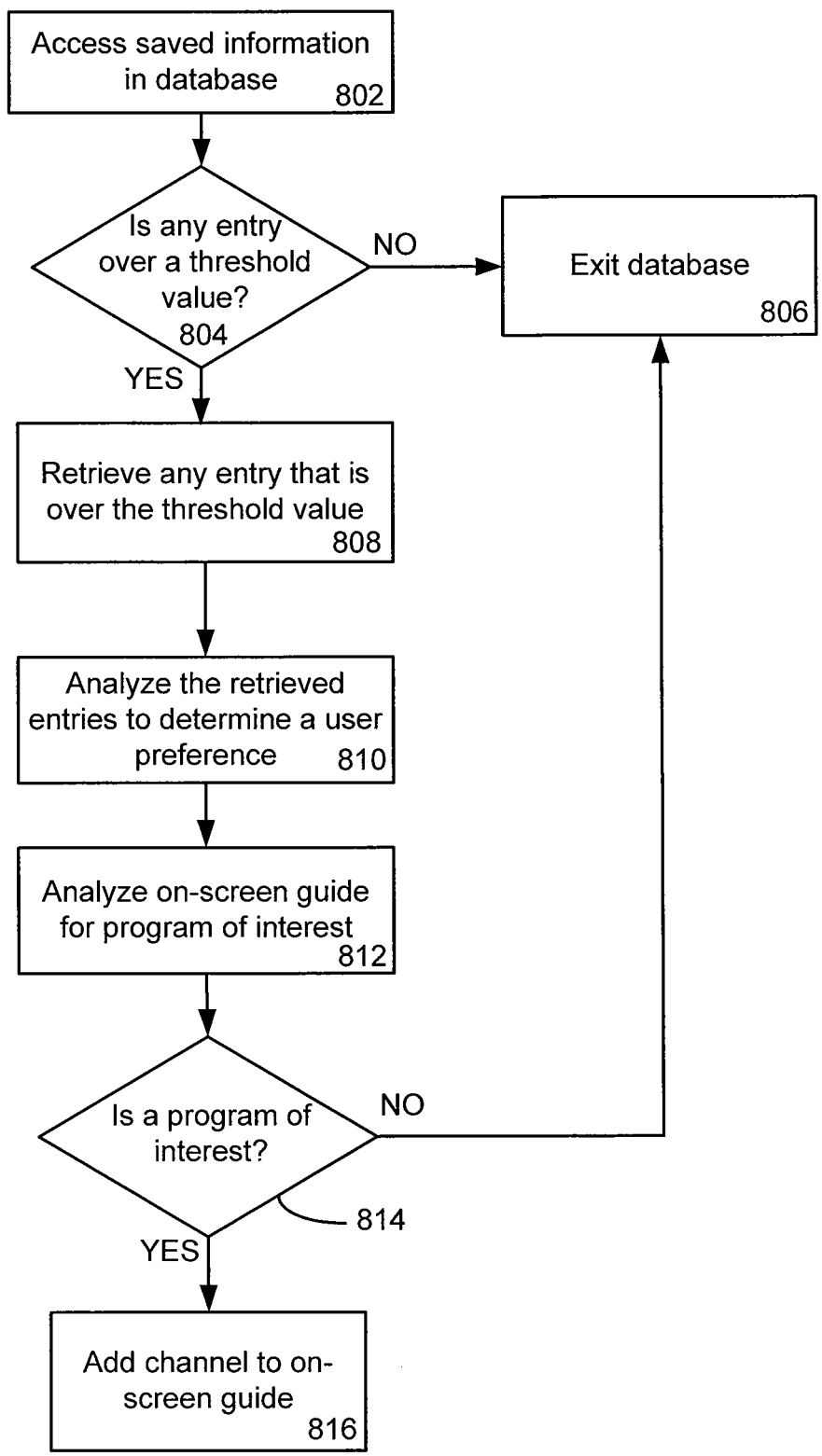
FIG. 8 is a flow chart depicting a method for a set-top box to provide a suggested multimedia presentation to a user in response to a monitored usage of the channel by the user.

The entries stored in memory that represent the channels and programs viewed by a user through a user classification may be utilized to offer a suggestion to the user of particular programs or channels that may be of interest to the user. For example, if the stored entries indicate that the user may be interested in certain sporting events, the user may be made aware of future sporting events that may be of interest to him. FIG. 8 depicts flow chart depicting a method for a set-top box to provide a suggested multimedia presentation to a user in response to a monitored usage of the channel by the user. Further, the operations of the described method may be performed by the components of a STB in a similar manner as described above with reference to FIGS. 6 and 7.

The method may begin in operation 802 when the STB may access a database in which are stored the entries corresponding to the user's viewing habits. As explained above, the memory medium including the created entries may be an internal memory of the STB or may be external to the STB, such as a server on a network. Thus, the STB may either access the internal memory of the STB or may access an external memory to retrieve the stored entries associated with that particular user classification.

In operation 804, the STB may determine if any of the stored entries have exceeded a pre-set threshold limit. The threshold value for each entry in memory may vary depending on the implementation of the method. For example, one implementation may utilize the number of times that a user accesses a particular channel or program as the threshold value. The number of accesses may be 20 in one embodiment, purely as one example. An embodiment may use different numbers of accesses as a threshold for different programs, channels, types of channels (e.g., movie channels, sports channels, and so on), thereby allowing separate threshold to be established based on factors such as channel or program type, channel or program themes or content, personalities appearing on channels or in programs, and so forth. Another threshold value may be the amount of time that a particular channel or program is viewed, such as ten hours. Generally, any threshold value that indicates that a user may be particularly interested in a subject matter or channel may be used with the embodiments described herein.

If no entry in the stored entries has achieved the threshold value, the STB may exit the database in operation 806. The lack of an entry that has achieved the threshold value may indicate that the STB has not gathered enough information about a user to provided a suggested channel to the user. However, if an entry is over the threshold value, this may indicate that the user may be interested in a particular channel or program. Thus, in operation 808, the STB may retrieve the entry or entries that have exceeded the threshold limit to determine a multimedia program that may be of interest to the user.

In operation 810, the STB may analyze the retrieved entries to determine a user's preferences. For example, the retrieved entries may indicate that a user may prefer to view action movies. This preference of the user may be determined from one or several entries that have exceeded a threshold value. For example, the database may contain entries from an action movie channel or entries indicating several programs from several movie channels, with each program entry being an action movie.

Once the user's preference is determined in operation 810, the STB may analyze an on-screen guide or other list of available programs to determine if any program may be of interest to the user in operation 812. Continuing the above example, the STB may analyze an on-screen guide to determine if an action movie is currently airing or will air in the near future. As should be appreciated, there may be several channels that fit this criteria. Further, the identification of a program of interest may include several limitations. For example, the identified programs may be limited by rating, available channels and the time of day that the program may air.

In operation 814, the STB may determine if any programs that may be of interest to the user are identified. If no programs are identified, the STB may exit the database by returning to operation 806. However, if one or more programs are identified as being of interest to the user based on the monitored user preferences, the STB may include the suggested content in an on-screen guide that may be accessed by the user in operation 816. Thus, when the user accesses the on-screen guide, those programs that may be of interest to the user may be presented within the guide to the user. In this manner, the user may be presented with multimedia content within the on-screen guide for easier access by the user. Alternatively, the user may be presented with multimedia content through a special menu or group of menus accessed by the user through a remote control device.

It should be noted that the flowchart of FIGS. 6-8 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for providing personalized multimedia content to a user by a television receiver, the television receiver comprising a processor that monitors the access of a plurality of channels by a user of the television system, the method comprising:

maintaining a database in a computer-readable storage medium accessible to the television receiver, the database maintaining an entry for each of the plurality of accessed channels, wherein a first portion of the plurality of accessed channels are those that the user has selected to watch live and a second portion of the plurality of accessed channels are those for which the user has recorded to a digital video recorder (DVR) associated with the television receiver, the entry containing at least one parameter of each of the plurality of accessed channels, wherein the at least one parameter is a subject matter of a multimedia program that aired on such accessed channel during the user's access of such accessed channel or that was recorded to the DVR;

analyzing the database to determine a first user preference and a second user preference, wherein each of the first and second user preferences specifies each of a time of day, a day of the week, and a preferred subject matter, wherein the analyzing is based at least in part on the maintained entries for each of the plurality of accessed channels, and wherein analyzing further comprises retrieving, from the database, each maintained entry that exceeds a pre-determined threshold value, wherein the threshold value is based on a number of times that a channel was accessed and on a cumulative duration of time that the channel was viewed, and analyzing the retrieved entries to determine the first and second user preferences, wherein the first and second user preferences differ from one another on the basis of each of the time of day, the day of the week, and the preferred subject matter; and at a first time of day and a first day of the week, providing a first option to the user to access a first further multimedia program, and additionally, at a second time of day and a second day of the week that is different from the first time and day of the week, providing a second option to the user, different from the first option, to access a second further multimedia program, wherein the steps of providing the first and second options are based, at least in part, on a correlation between the preferred subject matter of the determined first and second user preferences and the subject matter of the first and second further multimedia programs, respectively, and also on a correlation of an air date and time of the first and second further multimedia programs with the date and time of day of the determined first and second user preferences, respectively, and wherein the steps of providing the first and second options each further comprise: scanning a listing of at least one available further multimedia program, comparing the at least one available further multimedia program with the determined user preference, and inserting the at least one available further multimedia program into an on-screen guide of an interface of the television system, wherein the on-screen guide is characterized as an electronic programming guide comprising a channel column with channels listed in sequential numerical order beginning with a currently-viewed channel, wherein the step of inserting the at least one available further multimedia program comprises inserting a guide listing for the channel on which the at least one available further multimedia program is presented at a column position of the on-screen guide that is out-of-sequence with the sequential numerical order, and wherein the step or inserting the at least one available further multimedia program comprises inserting the guide listing at a time prior to the air time of the further multimedia program, such that the correlation of air date and time and the insertion of the guide listing time are asynchronous, the listing time occurring before the correlation time.

2. The method of claim 1 wherein one of the first portion of the plurality of accessed channels is a pay-per-view channel of the television system.

3. A television receiver comprising:
a microprocessor;
an I/O interface coupled to the microprocessor, the I/O interface configured to receive an input from a user of a television system; and
a computer-readable storage medium configured to store a computer-executable code that, when executed by the television receiver, causes the television receiver to perform the operations of:
monitoring for the input received from the user through the I/O port, wherein the input is accessing of a plurality of channels, wherein a first portion of the plurality of accessed channels are those that the users has selected to watch live and a second portion of the plurality of accessed channels are those for which the user has recorded to a digital video recorder (DVR) associated with the television receiver;

storing an indication of the plurality of accessed channels, along with a parameter of each of the accessed channels, the parameter comprising a subject matter of multimedia programs that air on the accessed channels, in a memory device when received;

determining a first user preference and a second user preference, wherein each of the first and second user preferences is based on a time of day, a day of the week, and the subject matter, wherein the determining is based at least in part on the stored indication for the accessed channels, and wherein determining further comprises retrieving, from the memory device, each stored indication that exceeds a pre-determined threshold value, wherein the threshold value is based on a number of times that a channel was accessed and on a cumulative duration of time that the channel was viewed, and analyzing the retrieved entries to determine the first and second user preferences;

analyzing a listing of a plurality of available multimedia programs to determine a first preferred multimedia program and a second preferred multimedia program, based, at least in part, on an air date and time of the preferred multimedia programs, the first and second user preferences, and on a geographical area wherein the television receiver is located, the first and second preferred multimedia programs including at least one feature that matches the first and second user preferences, respectively; and at a first time of day and a first day of the week, providing a first option to the user to access the first preferred multimedia program, and at a second time of day and a second day of the week, different from the first time of day and day of the week, providing a second option to the user to access the second preferred multimedia program, through an on-screen guide of the television receiver based, at least in part, on a correlation between the subject matter of the determined first and second user preferences and the subject matter of the first and second preferrred multimedia programs, respectively, and also on a correlation of the air date and time of the first and second preferred multimedia programs with the day of the week, time of day of the determined first and second user preferences, respectively, and the geographical area, and wherein the steps of providing the first and second options each further comprise: scanning a listing of at least one available preferred multimedia program, comparing the at least one available preferred multimedia program with the determined user preference, and inserting the at least one available preferred multimedia program into an on-screen guide of an interface of the television system, wherein the on-screen guide is characterized as an electronic programming guide comprising a channel column with channels listed in sequential numerical order beginning with a currently-viewed channel, wherein the step of inserting the at least one available further multimedia program comprises inserting a guide listing for the channel on which the at least one available further multimedia program is presented at a column position of the on-screen guide that is out-of-sequence with the sequential numerical order, and wherein the step or inserting the at least one available further multimedia program comprises inserting the guide listing at a time prior to the air time of the further multimedia program, such that the correlation of air date and time and the insertion of the guide listing time are asynchronous, the listing time occurring before the correlation time.

4. The television receiver of claim 3 further comprising: a modem in communication with a server on a network.

5. The television receiver of claim 4 wherein the memory device is the server on the network.

6. The television receiver of claim 3 wherein the memory device is an external hard drive associated with the television receiver.

7. The television receiver of claim 3 wherein the I/O port is an infra-red receiving device configured to receive the input from a remote control device.

8. The television receiver of claim 3 further comprising: a radio frequency (RF) tuner coupled to the microprocessor, the RF tuner configured an interface to a display, the interface comprising the on-screen guide.

* * * * *